United States Patent
Fan et al.

(10) Patent No.: US 10,756,597 B2
(45) Date of Patent: Aug. 25, 2020

(54) RADIAL VENTILATION COOLING STRUCTURE FOR MOTOR

(71) Applicant: BEIJING GOLDWIND SCIENCE & CREATION WINDPOWER EQUIPMENT CO., LTD., Beijing (CN)

(72) Inventors: Wenshou Fan, Beijing (CN); Shengjun Ma, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 425 days.

(21) Appl. No.: 15/549,316

(22) PCT Filed: Nov. 17, 2015

(86) PCT No.: PCT/CN2015/094824
§ 371 (c)(1),
(2) Date: Aug. 7, 2017

(87) PCT Pub. No.: WO2016/201877
PCT Pub. Date: Dec. 22, 2016

(65) Prior Publication Data
US 2018/0034347 A1    Feb. 1, 2018

(30) Foreign Application Priority Data
Jun. 17, 2015   (CN) .......................... 2015 1 0337278

(51) Int. Cl.
*H02K 9/16* (2006.01)
*H02K 1/20* (2006.01)
(Continued)

(52) U.S. Cl.
CPC ................. *H02K 9/16* (2013.01); *H02K 1/20* (2013.01); *H02K 1/32* (2013.01); *H02K 5/02* (2013.01);
(Continued)

(58) Field of Classification Search
CPC .. H02K 1/20; H02K 1/32; H02K 9/10; H02K 9/16
(Continued)

(56) References Cited

U.S. PATENT DOCUMENTS 4,415,822 A    11/1983  Aiba
6,204,530 B1   3/2001   Kazmierczak
(Continued)

FOREIGN PATENT DOCUMENTS

CN   1289167 A    3/2001
CN   101227110 A  7/2008
(Continued)

OTHER PUBLICATIONS

Xiao-Hong Hu, et al; "Structural Optimization for Roto Ventilation Cooling System of Turbo Generator with Air-Cooling", Journal of Power Engineering, vol. 29, No. 7, Jul. 2009, pp. 645-649.
(Continued)

*Primary Examiner* — Gary A Nash

(57) ABSTRACT

A radial ventilation cooling structure for a motor includes at least three core sections, a ventilation channel steel is provided between every two adjacent core sections, and a ventilation channel is formed between the ventilation channel steel and the every two adjacent core sections, and impedances of the multiple ventilation channels are gradually increased in a direction from two ends of the motor to a center of the motor.

20 Claims, 8 Drawing Sheets

(51) Int. Cl.
  *H02K 1/32* (2006.01)
  *H02K 9/10* (2006.01)
  *H02K 5/02* (2006.01)

(52) U.S. Cl.
  CPC ........... *H02K 9/10* (2013.01); *H02K 2205/12* (2013.01); *H02K 2213/03* (2013.01); *H02K 2213/09* (2013.01)

(58) Field of Classification Search
  USPC .............................................. 310/53, 57, 59
  See application file for complete search history.

(56) References Cited

U.S. PATENT DOCUMENTS

| | | | |
|---|---|---|---|
| 6,459,180 | B1 | 10/2002 | Mori et al. |
| 7,939,977 | B2 * | 5/2011 | Hattori ..................... H02K 3/51 |
| | | | 310/270 |
| 2002/0185921 | A1 | 12/2002 | Mori et al. |
| 2003/0071525 | A1 | 4/2003 | Tong et al. |
| 2003/0168920 | A1 | 9/2003 | Baer et al. |
| 2006/0071573 | A1 | 4/2006 | Fujita et al. |
| 2007/0024129 | A1 | 2/2007 | Pfannschmidt et al. |
| 2008/0169710 | A1 | 7/2008 | Hattori et al. |
| 2011/0181137 | A1 | 7/2011 | Kori et al. |
| 2011/0215661 | A1 * | 9/2011 | Kabata ..................... H02K 1/20 |
| | | | 310/59 |
| 2011/0241350 | A1 * | 10/2011 | Kori ......................... H02K 1/20 |
| | | | 290/55 |
| 2013/0200734 | A1 * | 8/2013 | Greer ........................ B32B 5/02 |
| | | | 310/59 |

FOREIGN PATENT DOCUMENTS

| | | |
|---|---|---|
| CN | 1784818 B | 6/2010 |
| CN | 102290922 A | 12/2011 |
| CN | 103701238 A | 4/2014 |
| CN | 103746485 A | 4/2014 |
| CN | 104410190 A | 3/2015 |
| CN | 204243930 U | 4/2015 |
| CN | 204290622 U | 4/2015 |
| CN | 104953766 A | 9/2015 |
| CN | 204669165 A | 9/2015 |
| EP | 1211780 A1 | 6/2002 |
| EP | 1646127 A2 | 4/2006 |
| EP | 2244355 A2 | 10/2010 |
| EP | 2403115 A1 | 1/2012 |
| JP | 5513617 A | 1/1980 |
| JP | 5866543 A | 4/1983 |
| JP | 60210138 A | 10/1985 |
| JP | 01136538 A | 5/1989 |
| JP | 2001-095205 A | 4/2001 |
| JP | 2014-023265 A | 2/2014 |

OTHER PUBLICATIONS

Xiaohong Hu, et al; "Study on the Flow Characteristics of Radial Ventilation in Turbo-generator Rotor", Journal of Mechanical Engineering, vol. 46, No. 14, Jul. 2010, pp. 138-142.
The First Chinese Office Action dated Jan. 19, 2017; Appln. 201510337278.2.
The Third Chinese Office Action dated Sep. 18, 2017; Appln. 201510337278.2.
Korean Office Action dated Oct. 29, 2016; Appln. 10-2015-0137470.
European Patent Office first office action dated May 6, 2019; Appln. No. 15895444.6.
The International Search Report dated Mar. 14, 2016; PCT/CN2015/094824.
Extended European Search Report dated Aug. 9, 2018; Appln. No. 15895444.6.
Australian Office Action Report No. 1 dated Apr. 21, 2018; Appln. No. 2015398808.

* cited by examiner

RADIAL VENTILATION COOLING STRUCTURE FOR MOTOR

CROSS-REFERENCE TO RELATED APPLICATIONS

This application is the national phase of International Application No. PCT/CN2015/094824, titled "RADIAL VENTILATION COOLING STRUCTURE FOR MOTOR", filed on Nov. 17, 2015, which claims the benefit of priority to Chinese Patent Application No. 201510337278.2 titled "RADIAL VENTILATION COOLING STRUCTURE FOR MOTOR", filed with the Chinese State Intellectual Property Office on Jun. 17, 2015, the entire disclosures of which are incorporated herein by reference.

FIELD

This application relates to the field of motor technology, and particularly to a radial ventilation cooling structure for a motor.

BACKGROUND

When a motor is operating, coils, cores and other components may have energy loss, this part of loss is eventually dissipated in the form of heat energy. Radial ventilation cooling is one of commonly used cooling manners for the motor. This cooling manner can increase the heat dissipation area and improve the power density of the generator, thus it has been widely used.

As shown in FIG. 1, the core of the motor is divided into multiple core sections 11, a ventilation channel steel 12 is provided between adjacent core sections 11 in a radial direction of the motor. The ventilation channel steel 12 has a supporting effect to the core sections 11, and also divides the space between adjacent core sections 11 into a ventilation channel 13. The motor has a recirculation ventilation path in which a cold air enters an air gap 14 from an end of a winding (not shown) and passes through the ventilation channel 13 (for example, branch ventilation channels 1 to 8 in the Figure), and reaches a cavity between two core brackets 15, and finally the hot air in the cavity is drawn through a pipeline to a heat exchanger outside the motor and converted into a cold air by the heat exchanger, and then the cold air enters the inside of the motor. As shown in FIG. 2, the ventilation channel steel 12 in the conventional radial ventilation cooling structure for the motor is a bar-shaped ventilation channel steel having a rectangular cross section, and the height of the ventilation channel 13 in an axial direction of the motor, that is the height h of the ventilation channel steel 12 in the axial direction of the motor (as shown in FIGS. 1 and 2), is equal to the distance between adjacent core sections 11 in the axial direction of the motor.

In the process of implementing the above ventilation cooling, the inventors have found that there are at least the following issues in the conventional technology. After the airflow enters the air gap, the velocity of the airflow is continuously reduced due to the bypassing effect, a local drag and a frictional drag of the ventilation channels and the like, thus the static pressure is increasingly greater and the dynamic pressure is increasingly smaller from an inlet of the air gap to a middle position of the air gap. However, since the multiple ventilation channel steels has the same structure and the multiple core sections has the same structure, the multiple ventilation channels have the same impedance, thus the quantity of airflow flowing through the multiple ventilation channels are increasingly larger. The heat generated by the internal heat source (coils, cores, and etc.) of the motor is distributed uniformly in the axial direction of the motor, while the airflow flowing through the multiple ventilation channels is distribute non-uniformly, thus the distribution of the temperature of the coils and the multiple core sections in the axial direction of the motor is not uniform, and the temperature from the inlet of the air gap to the middle position of the air gap is increasingly lower. The distribution of the temperature of the coils and the multiple core sections in the axial direction of the motor is not uniform, and the maximum temperature value is great, which is apt to cause a too high local temperature rising phenomenon, resulting in a shutdown of the motor, and is also apt to cause the core bracket to be thermally deformed, and therefore affecting the normal operation of the motor.

SUMMARY

A radial ventilation cooling structure for a motor is provided according to embodiments of the present application, which can improve the uniformity of the quantities of the airflow flowing through multiple ventilation channels, and in turn improve the uniformity of temperature distribution of coils and multiple core sections in an axial direction of the motor. Therefore, the maximum temperature value can be reduced without changing the total flowing quantity of the airflow, thus effectively avoiding the shutdown of the motor caused by an excessive local temperature rise, reducing the thermal deformation of a core bracket, and ensuring the normal operation of the motor.

In order to achieve the above objects, a radial ventilation cooling structure for a motor is provided according to the present application, which includes at least three core to sections, a ventilation channel steel is provided between every two adjacent core sections, and a ventilation channel is formed between the ventilation channel steel and the every two adjacent core sections, and impedances of the multiple ventilation channels are gradually increased in a direction from two ends of the motor to a center of the motor.

In the radial ventilation cooling structure for the motor according to the present application, the impedances of the multiple ventilation channels are gradually increased in the direction from the two ends of the motor to the center of the motor, thus improving the uniformity of the quantities of the airflow flowing through the multiple ventilation channels, and in turn improving the uniformity of the temperature distribution of the coils and the multiple core sections in the axial direction of the motor. Therefore, the maximum temperature value is reduced without changing the total quantity of the airflow, which effectively avoids the shutdown of the motor caused by the excessive local temperature rise and at the same time reduces the thermal deformation of the core bracket, thereby ensuring the normal operation of the motor.

| | | | |
|---|---|---|---|
| 11 | core section, | 111 | ventilation hole, |
| 112 | chamfer structure, | 113 | stamped sheet, |
| 12 | ventilation channel steel, | 121 | ventilation channel steel section, |
| 13 | ventilation channel, | 1-8 | branch ventilation channel, |
| 14 | air gap, and | 15 | core bracket. |

DETAILED DESCRIPTION

A radial ventilation cooling structure for a motor according to embodiments of the present application is described in detail hereinafter with reference to the accompanying drawings.

First Embodiment

Figure 1:
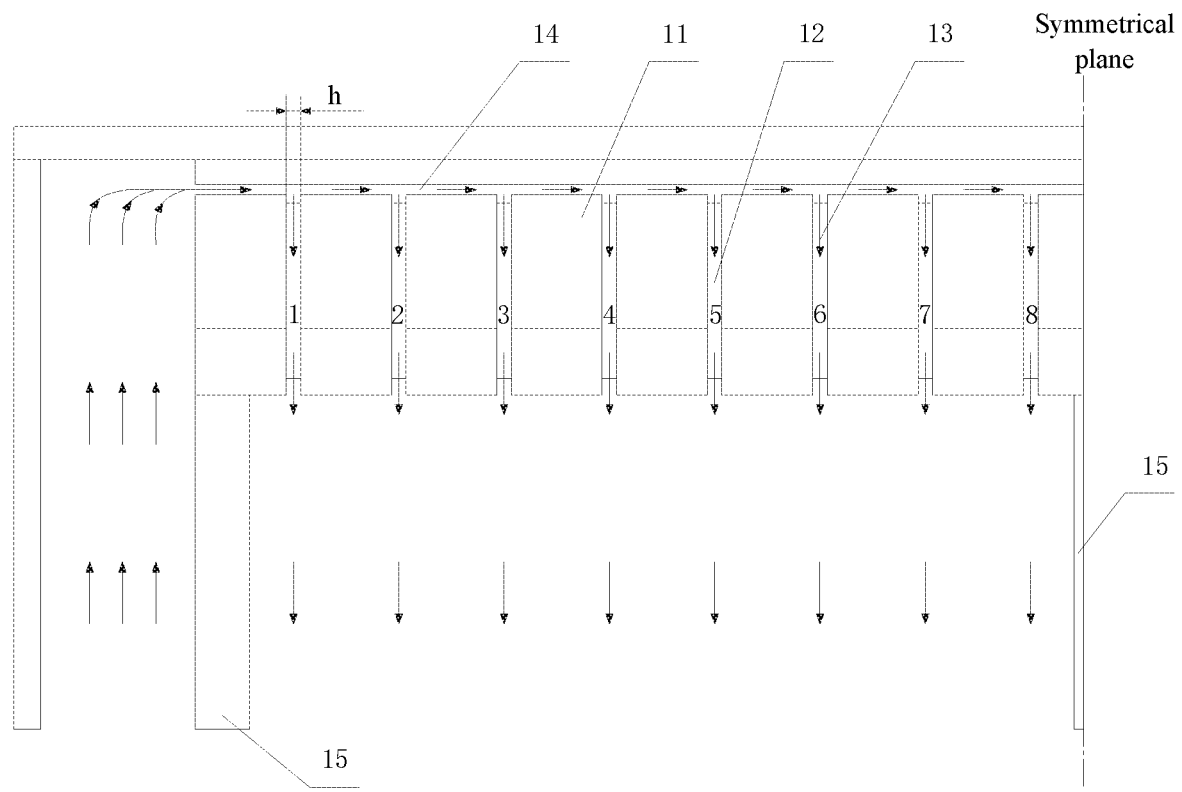
FIG. 1 is a schematic view showing the structure of a radial ventilation cooling structure for a motor according to the conventional technology.
Figure 2:
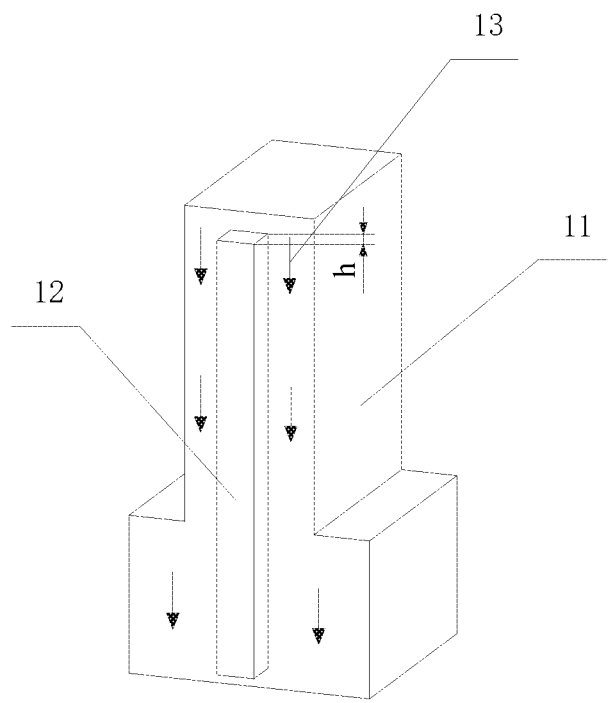
FIG. 2 is a schematic view showing the structure of a ventilation channel steel in the radial ventilation cooling structure for the motor according to the conventional technology.

Referring to a conventional radial ventilation cooling structure for a motor shown in FIG. 1, the radial ventilation cooling structure for the motor according to this embodiment of the present application also includes at least three core sections 11, a ventilation channel steel 12 is provided between every two adjacent core sections 11, and a ventilation channel 13 is formed between the ventilation channel steel 12 and the every two adjacent core sections 11. However, unlike the conventional radial ventilation cooling structure for the motor, in the radial ventilation cooling structure for the motor according to this embodiment of the present application, multiple ventilation channel steels 12 and/or multiple core sections 11 have different structures, which allows the impedances R of the multiple ventilation channels 13 to gradually increase in a direction from two ends of the motor to the center of the motor.

Figure 3:
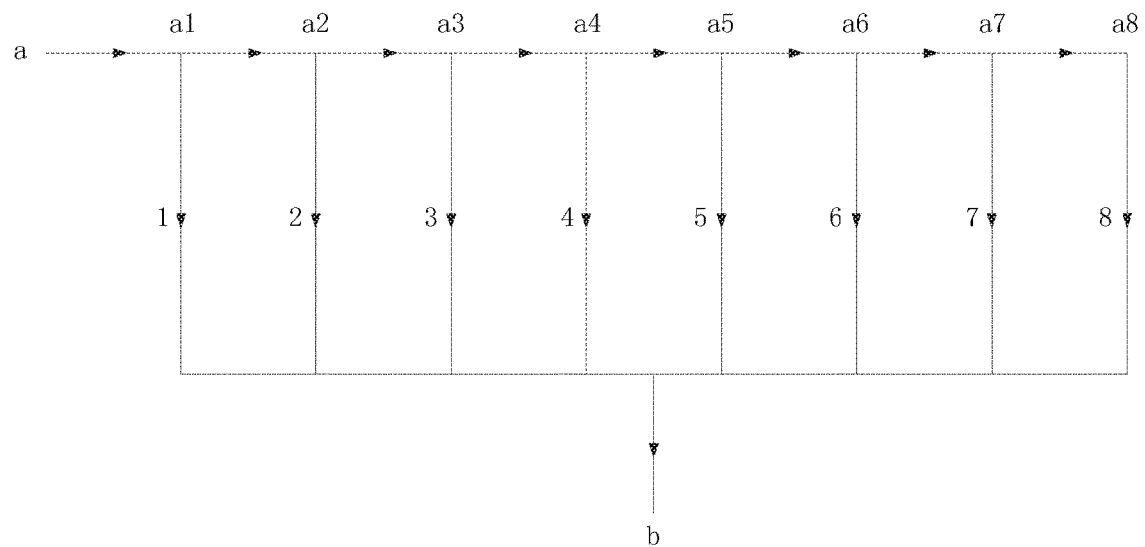
FIG. 3 is an equivalent schematic view of a radial ventilation cooling structure for a motor according to the present application.

The impedance R of the ventilation channel 13 is a drag (including a local drag and a frictional drag) applied by the ventilation channel 13 to the airflow. The ventilation channels 13 in the radial ventilation cooling structure for the motor according to this embodiment may be equivalent to pipelines connected in parallel in fluid mechanics. As shown in FIG. 3 (only a half of the symmetrical structure of the motor is shown), the node a is an air inlet of an air gap 14, and the nodes a1, a2, ..., a8 are respectively air inlets of branch ventilation channels 1, 2, ..., 8, and the node h is an air outlet of the branch ventilation channels 1, 2, ..., 8. After the airflow enters the air gap 14, the velocity of the airflow is increasingly smaller due to the bypassing effect, the local drag and the frictional drag of the ventilation channels 13 and other reasons, thus the static pressures U1, U2, ..., U8 of the airflow at the nodes a1, a2, ..., a8 is increasingly greater and the dynamic pressures of the airflow at the nodes a1, a2, ..., a8 is increasingly smaller from the inlet of the air gap 14 to the middle position of the air gap 14, that is, in the direction from two ends of the motor to the center of the motor. Assuming that the static pressure of the airflow at the node b (that is, the outlet of the ventilation channel 13) is U0, according to the flow distribution law of the parallel pipelines in fluid mechanics:

$$Q1:Q2: \ldots :Q8 = \sqrt{\frac{U1-U0}{R1}}:\sqrt{\frac{U2-U0}{R2}}: \ldots :\sqrt{\frac{U8-U0}{R8}},$$

where Q1, Q2, ..., Q8 are respectively the quantities of the airflow flowing through the branch ventilation channels 1, 2, ..., 8.

It can be seen that the impedances R of the multiple ventilation channels 13 are gradually increased in the direction from the two ends of the motor to the center of the motor, that is, the impedances R1, R2, ..., R8 of the branch ventilation channels 1, 2, ..., 8 are gradually increased (the impedance R1 of the branch ventilation channel 1 is minimum and the impedance R8 of the branch ventilation channel 8 is maximum), which can improve the uniformity of the quantities Q of the airflow flowing through the multiple ventilation channels 13. By adjusting the impedances R of the multiple ventilation channels 13, the quantities Q of the airflow flowing through the multiple ventilation channels 13 are enabled to be the same. The impedances R of the ventilation channels 13 are adjusted according to the following principle: if the quantity of the airflow flowing through a ventilation channel 13 is large, the impedance R of this ventilation channel 13 is increased; if the quantity of the airflow flowing through a ventilation channel 13 is small, the impedance R of this ventilation channel 13 is decreased, and the sum of the impedances R of the multiple ventilation channels 13 is constant.

In the radial ventilation cooling structure for the motor according to this embodiment of the present application, the impedances of the multiple ventilation channels are gradually increased in the direction from the two ends of the motor to the center of the motor, which improves the uniformity of the quantities of the airflow flowing through the multiple ventilation channels, and in turn improves the uniformity of the temperature distribution of the coils and the multiple core sections in the axial direction of the motor. Therefore, the maximum temperature value is reduced without changing the total quantity of the airflow, which effectively avoids the shutdown of the motor caused by the excessive local temperature rise and at the same time reduces the thermal deformation of the core bracket, thereby ensuring the normal operation of the motor.

Second Embodiment

Referring to the conventional radial ventilation cooling structure for the motor shown in FIG. 1, the radial ventilation cooling structure for the motor according to this embodiment of the present application also includes at least three core sections 11, a ventilation channel steel 12 is provided between every two adjacent core sections 11, and a ventilation channel 13 is formed between the ventilation channel steel 12 and the every two adjacent core sections 11. However, unlike the conventional radial ventilation cooling structure for the motor, in the radial ventilation cooling structure for the motor according to this embodiment of the present application, the multiple ventilation channel steels 12 and/or the multiple core sections 11 have different structures, thus the impedances R of the multiple ventilation channels 13 are gradually increased in the direction from two ends of the motor to the center of the motor, and the impedances S of the ventilation paths where the multiple ventilation channels 13 are located are equal. The impedance S of each of the ventilation paths is equal to the sum of the impedance R of the respective ventilation channel 13 in the ventilation path and the impedance of a respective air gap 14 in the ventilation path.

Referring to FIG. 3, the branches a→a1→b, a→a2→b, . . . , a→a8→b are respectively the ventilation paths where the branch ventilation channels 1, 2, . . . , 8 are located. The flow distribution law of the parallel pipelines in fluid mechanics is as follow:

$$Q1:Q2: \ldots :Q8 = \frac{1}{\sqrt{S1}}:\frac{1}{\sqrt{S2}}: \ldots :\frac{1}{\sqrt{S8}}.$$

Therefore, the impedances S1, S2, . . . , S8 of the branch ventilation paths where the branch ventilation channels 1, 2, . . . , 8 are located are equal, which allows the quantities Q1, Q2, . . . , Q8 of the airflow flowing through the branch ventilation channels 1, 2, . . . , 8 to be the same, that is, the impedances S of the ventilation paths where the multiple ventilation channels 13 are located are equal, which allows the quantities Q of the airflow flowing through the multiple ventilation channels 13 to be the same.

In the radial ventilation cooling structure for the motor according to this embodiment of the present application, the impedances of the multiple ventilation channels are gradually increased in the direction from the two ends of the motor to the center of the motor, and the impedances of the ventilation paths where the multiple ventilation channels are located are equal, thus the quantities of the airflow flowing through the multiple ventilation channels are the same, which improves the uniformity of the quantities of the airflow flowing through the multiple ventilation channels, and in turn improves the uniformity of the temperature distribution of the coils and the multiple core sections in the axial direction of the motor. Therefore, the maximum temperature value is reduced without changing the total quantity of the airflow, which effectively avoids the shutdown of the motor caused by the excessive local temperature rise and at the same time reduces the thermal deformation of the core bracket, thereby ensuring the normal operation of the motor.

Third Embodiment

Figure 4:
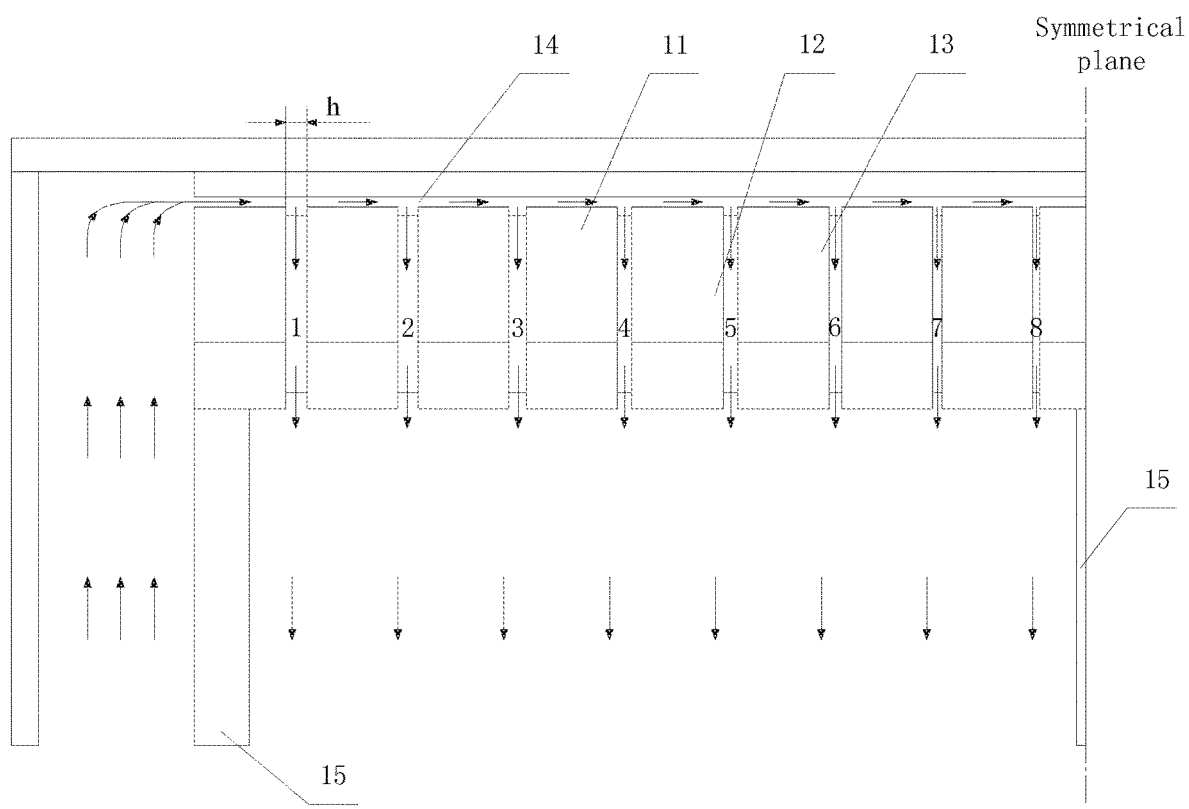
FIG. 4 is a schematic view showing the structure of a ventilation channel steel with an adjusted size in an embodiment of the radial ventilation cooling structure for the motor according to the present application.
Figure 5:
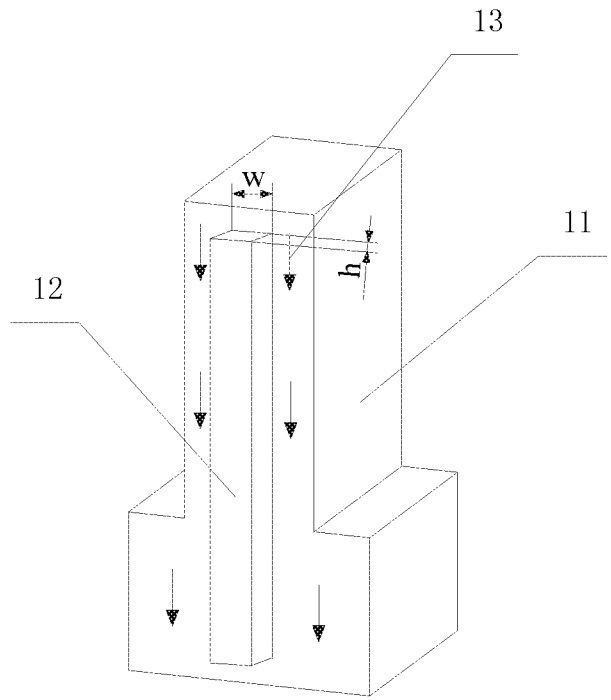
FIG. 5 is a schematic view showing the structure of the ventilation channel steel in the radial ventilation cooling structure for the motor shown in FIG. 4.

As shown in FIGS. 4 and 5, based on the first embodiment and the second embodiment, the radial ventilation cooling structure for the motor according to this embodiment provides a manner of adjusting the size of the ventilation channel steel 12 (including a height h in the axial direction of the motor and/or a width w in a circumferential direction of the motor), to allow the impedances R of the multiple ventilation channels 13 to gradually increase in the direction from the two ends of the motor to the center of the motor.

The ventilation channel steel 12 in this embodiment is still an integral bar-shaped ventilation channel steel in the shape of a straight line shape.

As the height h of the ventilation channel steel 12 increases, the impedance R of the corresponding ventilation channel 13 is decreased; and as the height h of the ventilation channel steel 12 decreases, the impedance R of the corresponding ventilation channel 13 is increased. Therefore, the heights h of the multiple ventilation channel steels 12 can be adjusted to be gradually decreased in the direction from the two ends of the motor to the center of the motor, to allow the impedances R of the multiple ventilation channels 13 to gradually increase in the direction from the two ends of the motor to the center of the motor. Preferably, to avoid affecting the electromagnetic performance of the motor, the sum of the heights h of the multiple ventilation channel steels 12 is constant after the size adjustment compared with the sum of the heights h before the size adjustment.

As the width w of the ventilation channel steel 12 increases, the impedance R of the corresponding ventilation channel 13 is increased; and as the width w of the ventilation channel steel 12 decreases, the impedance R of the corresponding ventilation channel 13 is decreased. Therefore, the widths w of the multiple ventilation channel steels 12 can be adjusted to be gradually increased in the direction from the two ends of the motor to the center of the motor, to allow the impedances R of the multiple ventilation channels 13 to gradually increase in the direction from the two ends of the motor to the center of the motor.

Preferably, to avoid affecting the electromagnetic performance of the motor as much as possible, the height h of each of the ventilation channel steels 12 cannot be too large, and should not be greater than 10 mm.

Preferably, in order to prevent each of the ventilation channels 13 from being blocked after it is baked with the vacuum pressure impregnating process (Vacuum Pressure Impregnating, abbreviated as VPI), the width w of each of the ventilation channel steels 12 cannot be too large, and should be less than the width of the core tooth by 12 mm or more. The height h of each of the ventilation channel steels 12 cannot be too small, and should not be less than 6 mm.

It is to be noted here that the impedances R of the multiple ventilation channels 13 may be enabled to gradually increase in the direction from the two ends of the motor to the center of the motor by only adjusting the height h of each of the ventilation channel steels 12, or only adjusting the width w of each of the ventilation channel steels 12, or adjusting both the heights h and the widths w of the multiple ventilation steel grooves 12 (for example, firstly adjusting the heights h of the multiple ventilation channel steels 12 and then finely adjusting the widths w of the multiple ventilation channel steels 12), or adjusting the heights h of a part of the ventilation channel steels 12 and the widths w of a part of the ventilation channel steels 12.

For example, in a manner of adjusting both the heights h and the widths w of the multiple ventilation steel grooves 12, the sizes of the multiple ventilation channel steels 12 are shown in Table 1:

TABLE 1

Sizes of the Multiple Ventilation Steel Channels

| Numbering | | 1 | 2 | 3 | 4 | 5 | 6 | 7 | 8 |
|---|---|---|---|---|---|---|---|---|---|
| Reference | Height h (mm) | 8 | 8 | 8 | 8 | 8 | 8 | 8 | 8 |
| | Width w (mm) | 8 | 8 | 8 | 8 | 8 | 8 | 8 | 8 |
| Adjusted | Height h (mm) | 9.5 | 9 | 8.5 | 8 | 8 | 7.5 | 7 | 6.5 |
| | Width w (mm) | 6 | 6.5 | 7 | 7.5 | 8 | 8.5 | 9 | 9.5 |

Figure 6:
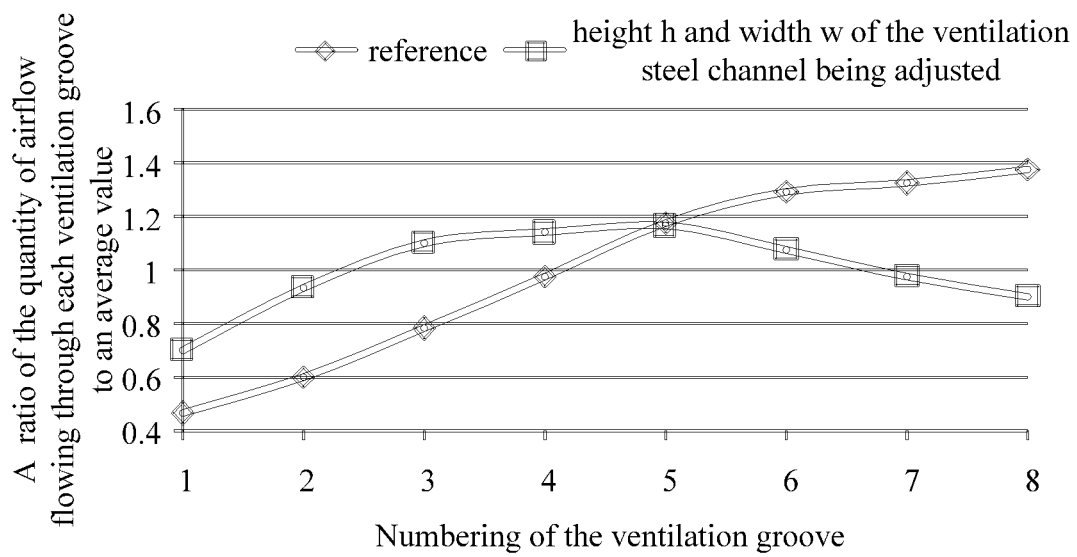
FIG. 6 is a schematic view showing the distribution of the quantities of the airflow flowing through multiple ventilation channels after the size of the ventilation channel steel is adjusted.

As shown in FIG. 6, which is a schematic view comparing the simulation calculation results of the quantities of the airflow flowing through the multiple ventilation channels after the heights h and the widths w of the multiple ventilation steel grooves are adjusted according to the sizes in Table 1 with the simulation calculation results of the quantities of the airflow flowing through the multiple ventilation channels before the sizes of the multiple ventilation steel grooves are adjusted. As can be seen from FIG. 6, by adjusting the heights h and the widths w of the multiple ventilation channel steels, the impedances R of the multiple ventilation channels 13 are adjusted to be gradually increased in the direction from the two ends of the motor to the center of the motor, which improves the uniformity of the quantities Q of the airflow flowing through the multiple ventilation channels 13. With further adjustment, the quantities Q of the airflows flowing through the multiple ventilation channels 13 can be enabled to be the same.

In the radial ventilation cooling structure for the motor according to this embodiment of the present application, the impedances of the multiple ventilation channels are gradually increased in the direction from the two ends of the motor to the center of the motor by adjusting the heights h and/or the widths w of the multiple ventilation channel steels, thereby improving the uniformity of the quantities of the airflow flowing through the multiple ventilation channels, and in turn improving the uniformity of the temperature distribution of the coils and the multiple core sections in the axial direction of the motor. Therefore, the maximum temperature value is reduced without changing the total quantity of the airflow, which effectively avoids the shutdown of the motor caused by the excessive local temperature rise and at the same time reduces the thermal deformation of the core bracket, thereby ensuring the normal operation of the motor.

Fourth Embodiment

As shown in FIGS. 7 to 10, based on the first embodiment or the second embodiment, the radial ventilation cooling structure for the motor according to this embodiment provides manners to allow the impedances R of the multiple ventilation channels 13 to gradually increase in the direction from the two ends of the motor to the center of the motor by arranging sections (the number n of the sections is different and/or the distances Δh between the sections in the radial direction of the motor are different) of the ventilation channel steel 12 in different arrangements (including linearly arranging the sections, staggering the sections, arranging the sections in the form of a character "吅", arranging the sections arranged in the form of an inverted character "吅").

Figure 7:
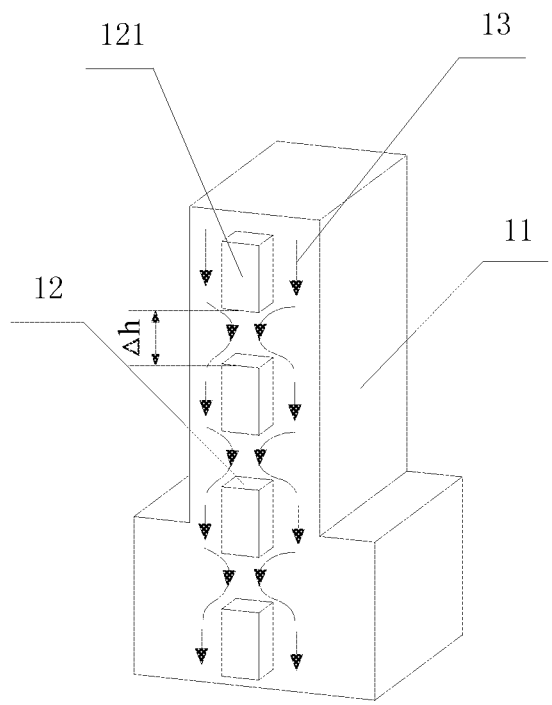
FIG. 7 is a schematic view showing the structure of a ventilation channel steel with its sections being arranged linearly in another embodiment of the radial ventilation cooling structure for the motor according to the present application.
Figure 8:
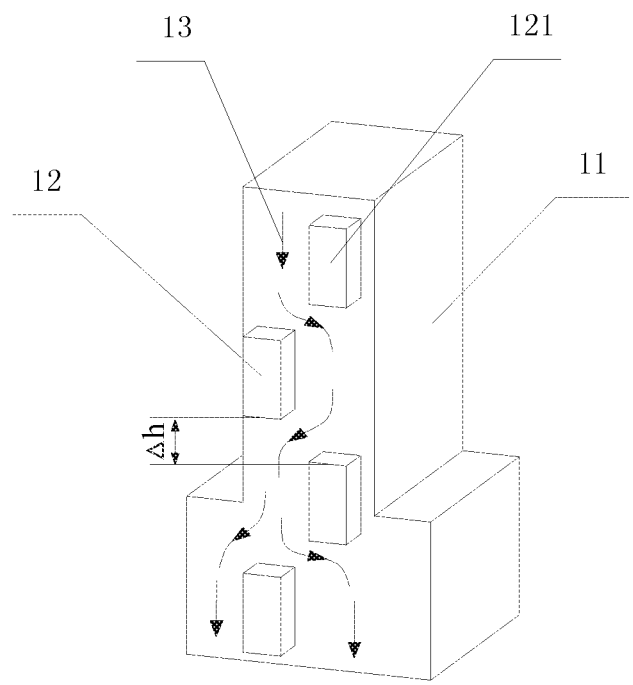
FIG. 8 is a schematic view showing the structure of a ventilation channel steel with its sections being arranged staggered in another embodiment of the radial ventilation cooling structure for the motor according to the present application.
Figure 9:
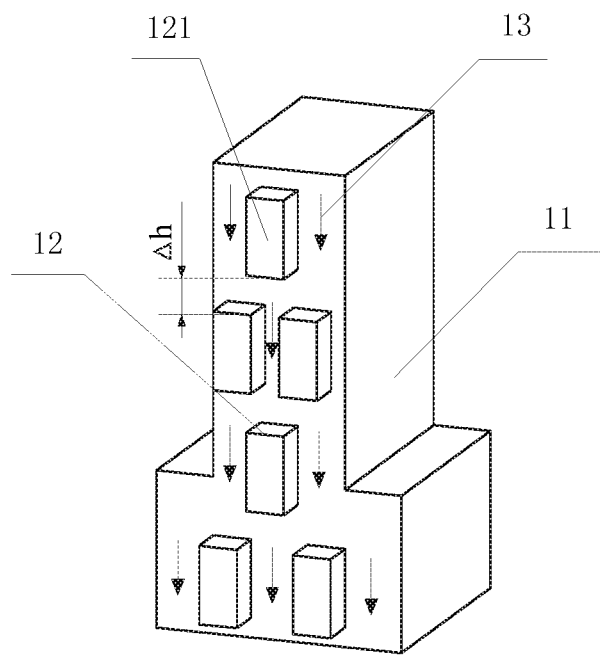
FIG. 9 is a schematic view showing the structure of a ventilation channel steel with its sections being arranged in the shape of a character " 凸 " in another embodiment of the radial ventilation cooling structure for the motor according to the present application.
Figure 10:
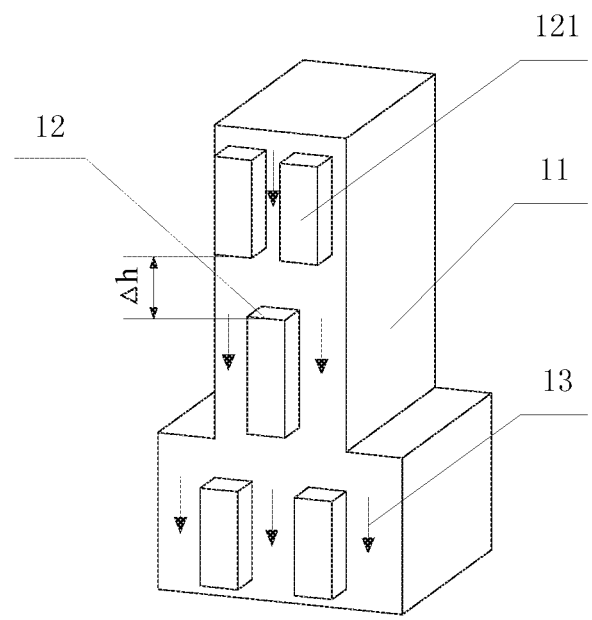
FIG. 10 is a schematic view showing the structure of a ventilation channel steel with its sections being arranged in the shape of an inverted character " 凸 " in another embodiment of the radial ventilation cooling structure for the motor according to the present application.

The ventilation channel steel 12 in this embodiment includes multiple separate ventilation channel steel sections 121 having the same structure. Each of the ventilation channel steel sections 121 is an integral bar-shaped ventilation channel steel section in the form of a straight line shape. The distances Δh between ventilation channel steel sections 121, adjacent in the radial direction of the motor, of the same ventilation channel steel 12 are the same. The sections of the ventilation channel steel 12 may be arranged linearly as shown in FIG. 7, or staggered as shown in FIG. 8, or arranged in the form of a character "吅" as shown in FIG. 9, or arranged in the form of an inverted character "吅" as shown in FIG. 10.

As the number n of the ventilation channel steel sections 121 of the ventilation channel steel 12 increases, the impedance R of the corresponding ventilation channel 13 is increased; and as the number n of the ventilation channel steel sections 121 of the ventilation channel steel 12 decreases, the impedance R of the corresponding ventilation channel 13 is decreased. Therefore, the number n of the ventilation channel steel sections 121 of the multiple ventilation channel steels 12 can be adjusted to be gradually increased in the direction from the two ends of the motor to the center of the motor, to allow the impedances R of the multiple ventilation channels 13 to gradually increase in the direction from the two ends of the motor to the center of the motor.

As the distance Δh between the ventilation channel steel sections 121 in the same ventilation channel steel 12 increases, the impedance R of the corresponding ventilation channel 13 is decreased; and as the distance Δh between the ventilation channel steel sections 121 in the same ventilation channel steel 12 decreases, the impedance R of the corresponding ventilation channel 13 is increased. Therefore, the distance Δh between the ventilation channel steel sections 121 of the multiple ventilation channel steels 12 can be adjusted to be gradually decreased in the direction from the two ends of the motor to the center of the motor, to allow the impedances R of the multiple ventilation channels 13 to gradually increase in the direction from the two ends of the motor to the center of the motor.

It is to be noted here that the impedances R of the multiple ventilation channels 13 may be adjusted to gradually increase in the direction from the two ends of the motor to the center of the motor by only adjusting the number n of the ventilation channel steel sections 121 of each of the ventilation channel steels 12, or only adjusting the distance Δh between the ventilation channel steel sections 121 of each of the ventilation channel steels 12, or adjusting both the number n of the ventilation channel steel sections 121 and the distance Δh between the ventilation channel steel sections 121 of the multiple ventilation steel grooves 12 (for example, firstly adjusting the number n of the ventilation channel steel sections 121 of the multiple ventilation channel steels 12 and then finely adjusting the distance Δh between the ventilation channel steel sections 121 of the multiple ventilation channel steels 12), or adjusting the heights h of a part of the ventilation channel steels 12 and the widths w of a part of the ventilation channel steels 12. The multiple ventilation channel steels 12 may have the same arrangement or different arrangements, that is, the arrangement of the multiple ventilation channel steels 12 may employ any one or a combination of the following arrangements: arranging the sections linearly as shown in FIG. 7, or staggering the sections as shown in FIG. 8, or arranging the sections in the form of a character "品" as shown in FIG. 9, or arranging the sections in the form of an inverted character "品" as shown in FIG. 10.

As can be known from simulation calculation, by adjusting the number n of the ventilation channel steel sections 121 and/or the distance Δh between the ventilation channel steel sections 121 in the multiple ventilation channel steels 12 and/or the arrangement of the multiple ventilation channel steels 12, the impedances R of the multiple ventilation channels 13 are adjusted to gradually increase in the direction from the two ends of the motor to the center of the motor, which can improve the uniformity of the quantities Q of the airflow flowing through the multiple ventilation channels 13. With further adjustment, the quantities Q of the airflow flowing through the multiple ventilation channels 13 are enabled to be the same.

In the radial ventilation cooling structure for the motor according to this embodiment of the present application, the impedances of the multiple ventilation channels are enabled to gradually increase in the direction from the two ends of the motor to the center of the motor by adjusting the number a of the ventilation channel steel sections and/or the distance Δh between the ventilation channel steel sections in the multiple ventilation channel steels and/or the arrangement of the multiple ventilation channel steels, thereby improving the uniformity of the quantities of the airflow flowing through the multiple ventilation channels, and in turn improving the uniformity of the temperature distribution of the coils and the multiple core sections in the axial direction of the motor. Therefore, the maximum temperature value is reduced without changing the total quantity of the airflow, which effectively avoids the shutdown of the motor caused by the excessive local temperature rise and at the same time reduces the thermal deformation of the core bracket, thereby ensuring the normal operation of the motor. In addition, each of the multiple ventilation channel steels is sectioned, which can effectively suppress the growth of the boundary layer, thereby enhancing the heat transfer and further reducing the temperature of the coils and the multiple core sections.

Fifth Embodiment

Figure 11:
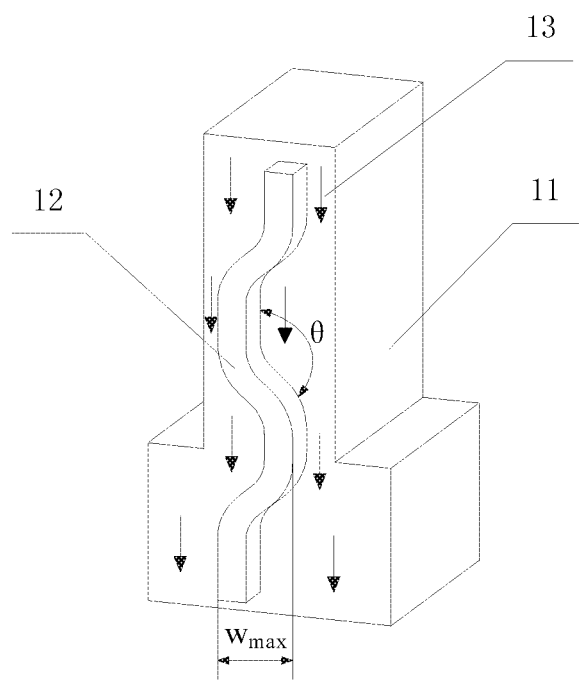
FIG. 11 is a schematic view showing the structure of a ventilation channel steel in an S-shape as a whole in another embodiment of the radial ventilation cooling structure for the motor according to the present application.

As shown in FIG. 11, based on the first embodiment or the second embodiment, the radial ventilation cooling structure for the motor according to this embodiment provides a manner to allow the impedances R of the multiple ventilation channels 13 to gradually increase in the direction from the two ends of the motor to the center of the motor by configuring each of the multiple ventilation channel steels 12 in the form of an integral S shape and adjusting the maximum widths $w_{max}$ of the multiple ventilation channel steels 12 in the circumferential direction of the motor and/or the numbers m of the turns of the multiple ventilation channel steels 12 and/or the bending angles θ of the turns of the multiple ventilation channel steels 12.

The ventilation channel steel 12 in this embodiment is a bar-shaped ventilation channel steel in the form of an integral S shape. Multiple turns of the same ventilation channel steel 12 have the same bending angle θ.

As the maximum width $w_{max}$ of the ventilation channel steel 12 increases, the impedance R of the corresponding ventilation channel 13 is increased; and as the maximum width $w_{max}$ of the ventilation channel steel 12 decreases, the impedance R of the corresponding ventilation channel 13 is decreased. Therefore, the maximum widths $w_{max}$ of the multiple ventilation channel steels 12 can be adjusted to be gradually increased in the direction from the two ends of the motor to the center of the motor, to allow the impedances R of the multiple ventilation channels 13 to gradually increase in the direction from the two ends of the motor to the center of the motor.

As the number m of the turns of the ventilation channel steel 12 increases, the impedance R of the corresponding ventilation channel 13 is increased; and as the number m of the turns of the ventilation channel steel 12 decreases, the impedance R of the corresponding ventilation channel 13 is decreased. Therefore, the numbers m of the turns of the multiple ventilation channel steels 12 can be adjusted to be gradually increased in the direction from the two ends of the motor to the center of the motor, to allow the impedances R of the multiple ventilation channels 13 to gradually increase in the direction from the two ends of the motor to the center of the motor.

As the bending angle θ of the turns of the ventilation channel steel 12 increases, the impedance R of the corresponding ventilation channel 13 is decreased; and as the bending angle θ of the turns of the ventilation channel steel 12 decreases, the impedance R of the corresponding ventilation channel 13 is increased. Therefore, the bending angle θ of the turns of the multiple ventilation channel steels 12 can be adjusted to be gradually decreased in the direction from the two ends of the motor to the center of the motor, to allow the impedances R of the multiple ventilation channels 13 to gradually increase in the direction from the two ends of the motor to the center of the motor.

It is to be noted here that the impedances R of the multiple ventilation channels 13 may be enabled to gradually increase in the direction from the two ends of the motor to the center of the motor by only adjusting the maximum width $w_{max}$ of each of the ventilation channel steels 12, or only adjusting the number m of the turns of each of the ventilation channel steels 12, or only adjusting the bending angle θ of the turns of each of the ventilation channel steels 12, or adjusting both the maximum widths $w_{max}$ and the numbers m of the turns of the multiple ventilation channel steels 12, or adjusting both the maximum widths $w_{max}$ and the bending angles θ of the turns of the multiple ventilation channel steels 12, or adjusting both the numbers m of the turns and the bending angles θ of the turns of the multiple ventilation channel steels 12, or adjusting the maximum widths $w_{max}$, the numbers m of the turns, and the bending angles θ of the turns of the multiple ventilation channel steels 12 at the same time, or adjusting the maximum widths $w_{max}$ of a part of the ventilation channel steels 12, the numbers m of the turns of a part of the ventilation channel steels 12, and the bending angles θ of the turns of a part of the ventilation channel steels 12.

As can be known from simulation calculation, by adjusting the maximum width $w_{max}$ and/or the number m of the turns and/or the bending angle θ of the turns of the multiple ventilation channel steels 12, the impedances R of the multiple ventilation channels 13 are adjusted to be gradually increased in the direction from the two ends of the motor to the center of the motor, which can improve the uniformity of the quantities Q of the airflow flowing through the multiple ventilation channels 13. With further adjustment, the quantities Q of the airflow flowing through the multiple ventilation channels 13 are enabled to be the same.

In the radial ventilation cooling structure for the motor according to this embodiment of the present application, the impedances of the multiple ventilation channels are enabled to gradually increase in the direction from the two ends of the motor to the center of the motor by adjusting the maximum widths $w_{max}$ and/or the number m of the turns and/or the bending angles θ of the turns of the multiple ventilation channel steels, thus improving the uniformity of the quantities of the airflow flowing through the multiple ventilation channels, and in turn improving the uniformity of the temperature distribution of the coils and the multiple core sections in the axial direction of the motor. Therefore, the maximum temperature value is reduced without changing the total quantity of the airflow, which effectively avoids the shutdown of the motor caused by the excessive local temperature rise and at the same time reduces the thermal deformation of the core bracket, thereby ensuring the normal operation of the motor. In addition, by configuring each of the multiple ventilation channel steels to be in the form of an integral S shape, the growth of the boundary layer can be effectively suppressed, thereby enhancing the heat transfer and further reducing the temperature of the coils and the multiple core sections.

Sixth Embodiment

Figure 12:
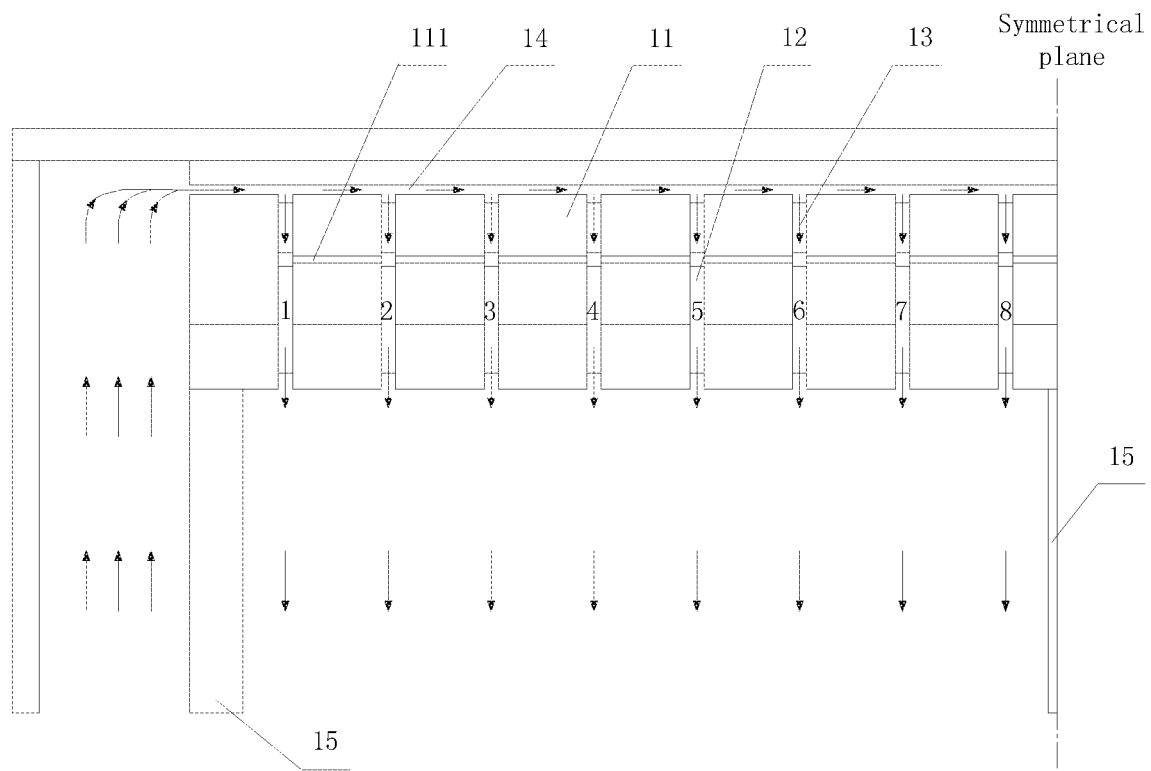
FIG. 12 is a schematic view showing the structure of multiple ventilation channels in communication with each other in another embodiment of the radial ventilation cooling structure for the motor according to the present application.

As shown in FIG. 12, based on the first embodiment or the second embodiment, the radial ventilation cooling structure for the motor according to this embodiment provides a manner to allow the impedances R of the multiple ventilation channels 13 to gradually increase in the direction from the two ends of the motor to the center of the motor by communicating the multiple ventilation channels 13 with each other.

Figure 13:
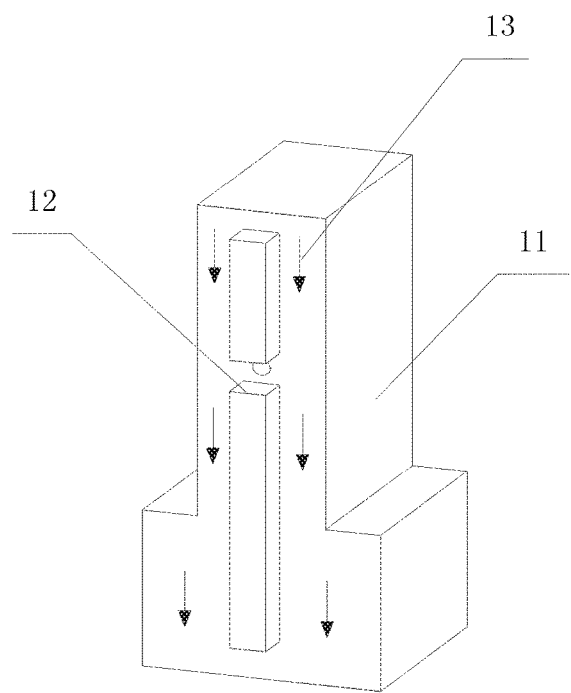
FIG. 13 is a schematic view showing the structure of a ventilation channel steel in the radial ventilation cooling structure for the motor shown in FIG. 12.

The radial ventilation cooling structure for the motor according to this embodiment is additionally provided with a ventilation hole 111 based on the radial ventilation cooling structure for the motor shown in FIG. 1. The core section 11 located between any two ventilation channels 13 is provided with the ventilation hole 111 in the axial direction of the motor. The ventilation hole 111 is configured to communicate the two ventilation channels 13 at two sides of the core section 11, as shown in FIG. 13. In order to ensure the multiple ventilation channels 13 to be in communication with each other, the ventilation channel steel 12 may be sectioned.

Preferably, to avoid affecting the electromagnetic performance of the motor as much as possible and to ensure that the ventilation channels 13 and the ventilation holes 111 will not blocked after being baked by the vacuum pressure impregnating VPI process, the diameter of each of the ventilation holes 111 should be ranged from 4 mm to 8 mm, inclusive. The number of the ventilation holes 111 in each of the core tooth portion should not be greater than three.

Preferably, the ventilation hole 111 is arranged in the core section 11 at a portion near the air inlet of the ventilation channel 13, that is, near the air gap 14.

Optionally, the ventilation holes 111 in different core sections 11 may have different altitudes in the radial direction of the motor.

As can be known from simulation calculation, by adjusting the diameters of the multiple ventilation holes 111 and/or the number of the ventilation holes 111 and/or the altitudes of the ventilation holes 111 in the core section 11, the impedances R of the multiple ventilation channels 13 can be adjusted to be gradually increased in the direction from the two ends of the motor to the center of the motor, which can improve the uniformity of the quantities Q of the airflow flowing through the multiple ventilation channels 13. With further adjustment, the quantities Q of the airflows flowing through the multiple ventilation channels 13 are enabled to be the same.

In the radial ventilation cooling structure for the motor according to this embodiment of the present application, the impedances of the multiple ventilation channels are enabled to gradually increase in the direction from the two ends of the motor to the center of the motor by communicating the multiple ventilation channels with each other and adjusting the diameters of the multiple ventilation holes and/or the number of the ventilation holes and/or the altitudes of the ventilation holes in the core sections, thus improving the uniformity of the quantities of the airflow flowing through the multiple ventilation channels, and in turn improving the uniformity of the temperature distribution of the coils and the multiple core sections in the axial direction of the motor. Therefore, the maximum temperature value is reduced without, changing the total quantity of the airflow, which effectively avoids the shutdown of the motor caused by the excessive local temperature rise and at the same time reduces the thermal deformation of the core bracket, thereby ensuring the normal operation of the motor.

Seventh Embodiment

Figure 14:
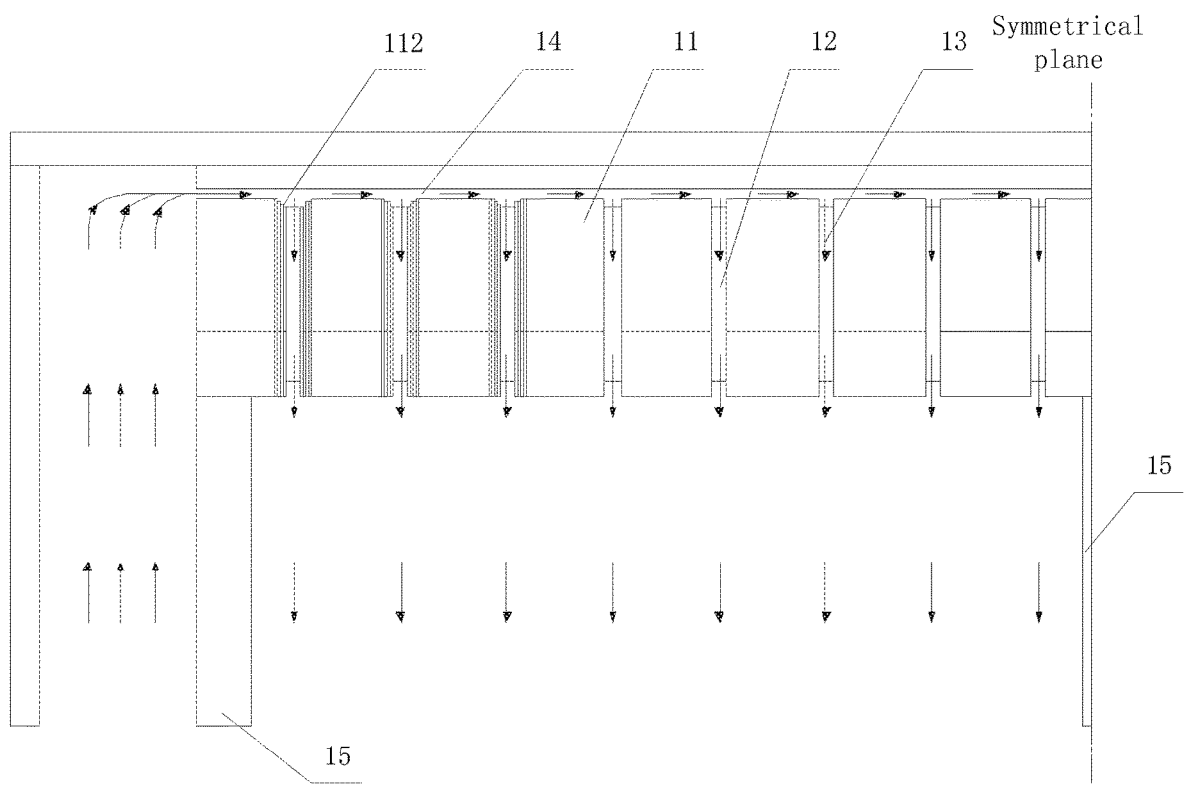
FIG. 14 is a schematic view showing the structure of core sections having chamfer structures in another embodiment of the radial ventilation cooling structure for the motor according to the present application.

As shown in FIG. 14, based on the first embodiment or the second embodiment, the radial ventilation cooling structure for the motor according to this embodiment provides a manner to allow the impedances R of the multiple ventilation channels 13 to gradually increase in the direction from the two ends of the motor to the center of the motor by providing each of multiple core sections 11 with a chamfer structure 112.

The radial ventilation cooling structure for the motor according to this embodiment additionally arranges the chamfer structures 112 on multiple core sections 11 based on the radial ventilation cooling structure for the motor shown in FIG. 1. The chamfer structure 112 is arranged on the core section 11 at a portion near the air inlet of the ventilation channel 13, that is, near the air gap 14, to reduce the local drag at the air inlet of each of the multiple ventilation channels 13. Moreover, the widths of openings of the multiple chamfer structures 112 are gradually reduced in the direction from the two ends of the motor to the center of the motor, and the local drags at the air inlets of the multiple ventilation channels 13 are gradually increased in the direction from the two ends of the motor to the center of the motor, thus the impedances R of the multiple ventilation channels 13 are gradually increased in the direction from the two ends of the motor to the center of the motor, which can improve the uniformity of the quantities Q of the airflow flowing through the multiple ventilation channels 13. With further adjustment, the quantities Q of the airflow flowing through the multiple ventilation channels 13 are enabled to be the same.

Figure 15:
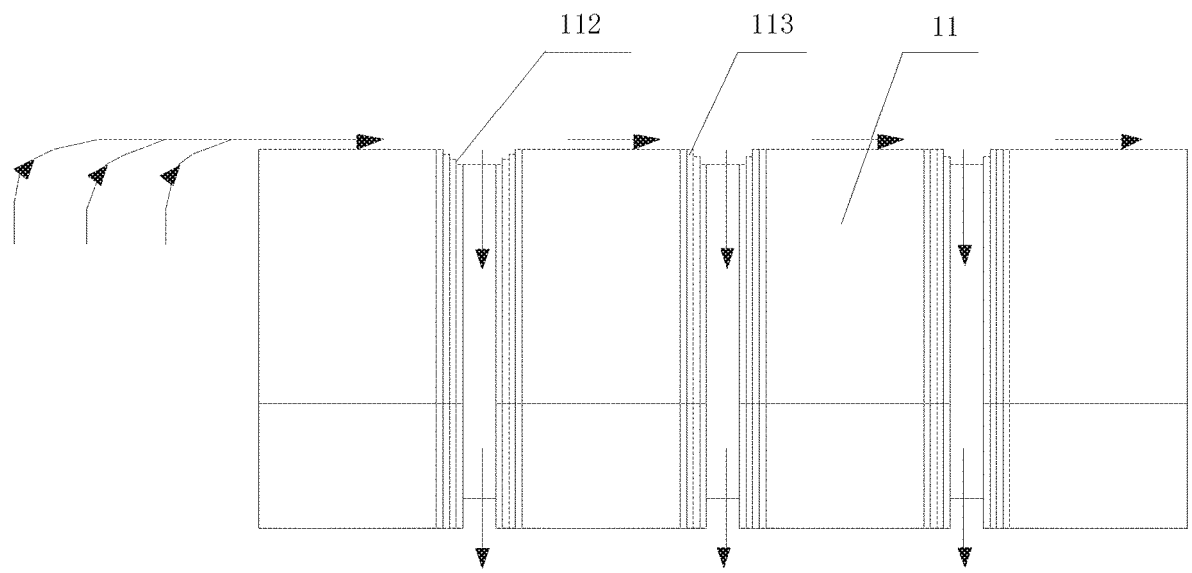
FIG. 15 is a schematic view showing the structure of the chamfer structures of the core sections in the radial ventilation cooling structure for the motor shown in FIG. 14.

As shown in FIG. 15, since the core section 11 is formed by laminating multiple stamped sheets 113, the laminated core section 11 can be formed with the step-shaped chamfer structure 112 by adjusting the tooth radial height of each of the stamped sheets 113.

In the radial ventilation cooling structure for the motor according to this embodiment of the present application, the impedances of the multiple ventilation channels are enabled to gradually increase in the direction from the two ends of the motor to the center of the motor by providing chamfer structures on the multiple core sections, thus improving the uniformity of the quantities of the airflow flowing through the multiple ventilation channels, and in turn improving the uniformity of the temperature distribution of the coils and the multiple core sections in the axial direction of the motor. Therefore, the maximum temperature value is reduced without changing the total quantity of the airflow, which effectively avoids the shutdown of the motor caused by the excessive local temperature rise and at the same time reduces the thermal deformation of the core bracket, thereby ensuring the normal operation of the motor.

Eighth Embodiment

Figure 16:
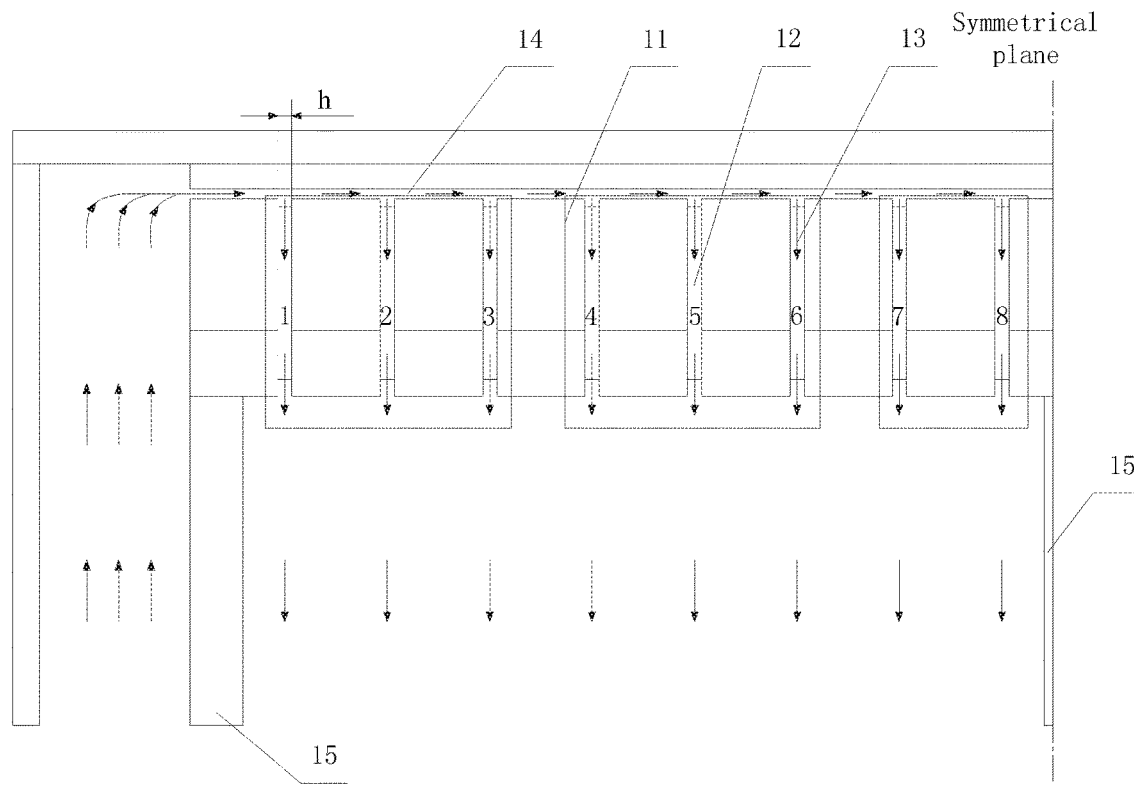
FIG. 16 is a schematic view showing the structure of the grouped ventilation channel steels in another embodiment of the radial ventilation cooling structure for the motor according to the present application.

The ventilation channel steels 12 can be divided into multiple groups. As shown in FIG. 16, based on the first embodiment or the second embodiment, the ventilation channel steels 12 are divided into multiple groups, and the ventilation channel steels in each of the dashed boxes shown in FIG. 16 belong to one group, and each group has at least one of the ventilation channel steels 12. The ventilation channel steels 12 in each group have the same shape and the same arrangement, and the ventilation channel steels 12 in the multiple groups employ any one or a combination of the following shapes and arrangements: an integral straight line shape as shown in FIG. 5, arranging sections linearly as shown in FIG. 7, or staggering sections as shown in FIG. 8, arranging sections in the form of a character "品" as shown in FIG. 9, arranging sections in the form of an inverted character "吕" as shown in FIG. 10, or an integral S shape as shown in FIG. 11. Preferably, the above solution can also be combined with the solution of the sixth embodiment shown in FIGS. 12 to 13 in which the multiple ventilation channels 13 are in communication with each other and/or the solution of the seventh embodiment shown in FIGS. 14 to 15 in which the chamfer structures 112 are provided on the multiple core sections 11.

Ninth Embodiment

The ventilation channel steel 12 can employ any one or a combination of the following shapes and arrangements: an integral straight line shape as shown in FIG. 5, arranging sections linearly as shown in FIG. 7, staggering sections as shown in FIG. 8, arranging sections in the form of a character "品" as shown in FIG. 9, arranging sections in the form of an inverted character "吕" as shown in FIG. 10, or an integral S shape as shown in FIG. 11. Preferably, the above solution can also be combined with the solution of the sixth embodiment shown in FIGS. 12 to 13 in which the multiple ventilation channels 13 are in communication with each other and/or the solution of the seventh embodiment shown in FIGS. 14 to 15 in which the chamfer structures 112 are provided on the multiple core sections 11.

The above descriptions are only the specific embodiments of the present application. However, the scope of protection of the present application is not limited thereto, and any variations or substitutions easily made by the person skilled in the art within the technical scope disclosed by the present application are deemed to fall into the scope of protection of the present application. Therefore, the scope of protection of the present application is defined by the claims.

What is claimed is:

1. A radial ventilation cooling structure for a motor, comprising at least three core sections, a ventilation channel steel provided between every two adjacent core sections, and a ventilation channel formed between the ventilation channel steel and the every two adjacent core sections, wherein impedances of a plurality of ventilation channels are gradually increased in a direction from two ends of the motor to a center of the motor.

2. The radial ventilation cooling structure for the motor according to claim 1, wherein impedances of ventilation paths where the plurality of ventilation channels are located are equal, and the impedance of each of the ventilation paths is equal to the sum of the impedance of the respective ventilation channel in the ventilation path and a impedance of an air gap in the ventilation path.

3. The radial ventilation cooling structure for the motor according to claim 2, wherein the ventilation channel steel comprises a plurality of groups, and each group comprises at least one of the ventilation channel steels, each group employs any one of the following structures: the ventilation channel steel being arranged in the form of an integral straight line shape, sections of the ventilation channel steel being arranged linearly, sections of the ventilation channel steel being staggered, sections of the ventilation channel steel being arranged in the form of a character "品", sections of the ventilation channel steel being arranged in the form of an inverted character "吕", or the ventilation channel steel being arranged in the form of an integral S shape;

in the same group which comprises a plurality of ventilation channel steels, structural parameters of the ventilation channel steels are set in any one or a combination of the following manners:

setting heights of the ventilation channel steels in an axial direction of the motor to gradually decrease in the direction from the two ends of the motor to the center of the motor;

setting widths of the ventilation channel steels in a circumferential direction of the motor to gradually increase in the direction from the two ends of the motor to the center of the motor;

setting the numbers of ventilation channel steel sections of the ventilation channel steels to gradually increase in the direction from the two ends of the motor to the center of the motor;

setting distances between ventilation channel steel sections, adjacent in a radial direction of the motor, of the ventilation channel steels to gradually decrease in the direction from the two ends of the motor to the center of the motor;

setting maximum widths, in the circumferential direction of the motor, of the ventilation channel steels to gradually increase in the direction from the two ends of the motor to the center of the motor;

setting the numbers of turns of the ventilation channel steels to gradually increase in the direction from the two ends of the motor to the center of the motor; and setting bending angles of the turns of the ventilation channel steels to gradually decrease in the direction from the two ends of the motor to the center of the motor.

4. The radial ventilation cooling structure for the motor according to claim 2, wherein each of the ventilation channel steels employs any one of the following structures: the ventilation channel steel being arranged in the form of an integral straight line shape, sections of the ventilation channel steel being arranged linearly, sections of the ventilation channel steel being staggered, sections of the ventilation channel steel being arranged in the form of a character "吅", sections of the ventilation channel steel being arranged in the form of an inverted character "凹", or the ventilation channel steel being arranged in the form of an integral S shape.

5. The radial ventilation cooling structure for the motor according to claim 2, wherein the ventilation channel steel is an integral bar-shaped ventilation channel steel in the form of a straight line shape, and heights of the plurality of ventilation channel steels in an axial direction of the motor are gradually decreased in the direction from the two ends of the motor to the center of the motor and/or widths of the plurality of ventilation channel steels in a circumferential direction of the motor are gradually increased in the direction from the two ends of the motor to the center of the motor.

6. The radial ventilation cooling structure for the motor according to claim 2, wherein the ventilation channel steel comprises a plurality of separate ventilation channel steel sections having the same structure, each of the ventilation channel steel sections is an integral bar-shaped ventilation channel steel section in the form of a straight line shape; distances between ventilation channel steel sections, adjacent in a radial direction of the motor, of the same ventilation channel steel are the same; and the numbers of the ventilation channel steel sections in the plurality of ventilation channel steels are gradually increased in the direction from the two ends of the motor to the center of the motor and/or the distances between the ventilation channel steel sections, adjacent in the radial direction of the motor, in the plurality of ventilation channel steels are gradually decreased in the direction from the two ends of the motor to the center of the motor.

7. The radial ventilation cooling structure for the motor according to claim 6, wherein each of the ventilation channel steels has the following arrangements: sections of the ventilation channel steel being arranged linearly, sections of the ventilation channel steel being staggered, sections of the ventilation channel steel being arranged in the form of a character "吅", or sections of the ventilation channel steel being arranged in the form of an inverted character "凹".

8. The radial ventilation cooling structure for the motor according to claim 2, wherein the ventilation channel steel is an integral bar-shaped ventilation channel steel in the form of an S shape, bending angles of a plurality of turns of the same ventilation channel steel are the same, and the plurality of ventilation channel steels satisfy one or a combination of the following conditions:

maximum widths, in the circumferential direction of the motor, of the plurality of ventilation channel steels are gradually increased in the direction from the two ends of the motor to the center of the motor;

the numbers of the turns of the plurality of ventilation channel steels are gradually increased in the direction from the two ends of the motor to the center of the motor; and the bending angles of the turns of the plurality of ventilation channel steels are gradually decreased in the direction from the two ends of the motor to the center of the motor.

9. The radial ventilation cooling structure for the motor according to claim 2, wherein the core section is provided with a ventilation hole in an axial direction of the motor, and the ventilation hole is configured to communicate two ventilation channels at two sides of the core section.

10. The radial ventilation cooling structure for the motor according to claim 9, wherein the ventilation hole is arranged in the core section at a portion near an air inlet of the ventilation channel.

11. The radial ventilation cooling structure for the motor according to claim 2, wherein a portion of the core section near an air inlet of the ventilation channel is configured as a chamfer structure, and widths of openings of a plurality of chamfer structures are gradually reduced in the direction from the two ends of the motor to the center of the motor.

12. The radial ventilation cooling structure for the motor according to claim 1, wherein the ventilation channel steel comprises a plurality of groups, and each group comprises at least one of the ventilation channel steels, each group employs any one of the following structures: the ventilation channel steel being arranged in the form of an integral straight line shape, sections of the ventilation channel steel being arranged linearly, sections of the ventilation channel steel being staggered, sections of the ventilation channel steel being arranged in the form of a character "吅", sections of the ventilation channel steel being arranged in the form of an inverted character "凹", or the ventilation channel steel being arranged in the form of an integral S shape;

in the same group which comprises a plurality of ventilation channel steels, structural parameters of the ventilation channel steels are set in any one or a combination of the following manners:

setting heights of the ventilation channel steels in an axial direction of the motor to gradually decrease in the direction from the two ends of the motor to the center of the motor;

setting widths of the ventilation channel steels in a circumferential direction of the motor to gradually increase in the direction from the two ends of the motor to the center of the motor;

setting the numbers of ventilation channel steel sections of the ventilation channel steels to gradually increase in the direction from the two ends of the motor to the center of the motor;

setting distances between ventilation channel steel sections, adjacent in a radial direction of the motor, of the ventilation channel steels to gradually decrease in the direction from the two ends of the motor to the center of the motor;

setting maximum widths, in the circumferential direction of the motor, of the ventilation channel steels to gradually increase in the direction from the two ends of the motor to the center of the motor;

setting the numbers of turns of the ventilation channel steels to gradually increase in the direction from the two ends of the motor to the center of the motor; and setting bending angles of the turns of the ventilation channel steels to gradually decrease in the direction from the two ends of the motor to the center of the motor.

13. The radial ventilation cooling structure for the motor according to claim 1, wherein each of the ventilation channel steels employs any one of the following structures: the ventilation channel steel being arranged in the form of an integral straight line shape, sections of the ventilation channel steel being arranged linearly, sections of the ventilation channel steel being staggered, sections of the ventilation channel steel being arranged in the form of a character "品", sections of the ventilation channel steel being arranged in the form of an inverted character "品", or the ventilation channel steel being arranged in the form of an integral S shape.

14. The radial ventilation cooling structure for the motor according to claim 1, wherein the ventilation channel steel is an integral bar-shaped ventilation channel steel in the form of a straight line shape, and heights of the plurality of ventilation channel steels in an axial direction of the motor are gradually decreased in the direction from the two ends of the motor to the center of the motor and/or widths of the plurality of ventilation channel steels in a circumferential direction of the motor are gradually increased in the direction from the two ends of the motor to the center of the motor.

15. The radial ventilation cooling structure for the motor according to claim 1, wherein the ventilation channel steel comprises a plurality of separate ventilation channel steel sections having the same structure, each of the ventilation channel steel sections is an integral bar-shaped ventilation channel steel section in the form of a straight line shape; distances between ventilation channel steel sections, adjacent in a radial direction of the motor, of the same ventilation channel steel are the same; and the numbers of the ventilation channel steel sections in the plurality of ventilation channel steels are gradually increased in the direction from the two ends of the motor to the center of the motor and/or the distances between the ventilation channel steel sections, adjacent in the radial direction of the motor, in the plurality of ventilation channel steels are gradually decreased in the direction from the two ends of the motor to the center of the motor.

16. The radial ventilation cooling structure for the motor according to claim 15, wherein each of the ventilation channel steels has the following arrangements: sections of the ventilation channel steel being arranged linearly, sections of the ventilation channel steel being staggered, sections of the ventilation channel steel being arranged in the form of a character "品", or sections of the ventilation channel steel being arranged in the form of an inverted character "品".

17. The radial ventilation cooling structure for the motor according to claim 1, wherein the ventilation channel steel is an integral bar-shaped ventilation channel steel in the form of an S shape, bending angles of a plurality of turns of the same ventilation channel steel are the same, and the plurality of ventilation channel steels satisfy one or a combination of the following conditions:
maximum widths, in the circumferential direction of the motor, of the plurality of ventilation channel steels are gradually increased in the direction from the two ends of the motor to the center of the motor;
the numbers of the turns of the plurality of ventilation channel steels are gradually increased in the direction from the two ends of the motor to the center of the motor; and
the bending angles of the turns of the plurality of ventilation channel steels are gradually decreased in the direction from the two ends of the motor to the center of the motor.

18. The radial ventilation cooling structure for the motor according to claim 1, wherein the core section is provided with a ventilation hole in an axial direction of the motor, and the ventilation hole is configured to communicate two ventilation channels at two sides of the core section.

19. The radial ventilation cooling structure for the motor according to claim 9, wherein the ventilation hole is arranged in the core section at a portion near an air inlet of the ventilation channel.

20. The radial ventilation cooling structure for the motor according to claim 1, wherein a portion of the core section near an air inlet of the ventilation channel is configured as a chamfer structure, and widths of openings of a plurality of chamfer structures are gradually reduced in the direction from the two ends of the motor to the center of the motor.

* * * * *